United States Patent
Kachel et al.

(10) Patent No.: US 6,678,593 B2
(45) Date of Patent: Jan. 13, 2004

(54) DEVICE AND METHOD FOR MONITORING A PRESSURE SENSOR

(75) Inventors: Gerhard Kachel, Karlsruhe (DE); Stefan Otterbein, Stuttgart (DE); Klaus Landesfeind, Backnang (DE); Mike Gansler, Candia, NH (US)

(73) Assignee: Robert Bosch GmbH, Stuttgart (DE)

( * ) Notice: Subject to any disclaimer, the term of this patent is extended or adjusted under 35 U.S.C. 154(b) by 33 days.

(21) Appl. No.: 10/035,904

(22) Filed: Dec. 31, 2001

(65) Prior Publication Data

US 2003/0004625 A1 Jan. 2, 2003

(30) Foreign Application Priority Data

Dec. 30, 2000 (DE) ......................................... 100 65 759

(51) Int. Cl.[7] ............................................. G06F 19/00
(52) U.S. Cl. ..................... 701/34; 701/76; 303/122.05
(58) Field of Search ............................ 701/29, 34, 76; 303/122.05, 122.09; 340/438, 439, 451

(56) References Cited

U.S. PATENT DOCUMENTS

| | | | |
|---|---|---|---|
| 4,817,019 A | | 3/1989 | Morihara et al. |
| 6,394,561 B1 | * | 5/2002 | Sakamoto et al. ..... 303/122.05 |
| 6,401,018 B1 | * | 6/2002 | Oba et al. ..................... 701/34 |
| 6,434,456 B1 | * | 8/2002 | Babala et al. .................. 701/34 |
| 6,494,545 B2 | * | 12/2002 | Nakamura et al. ............ 303/87 |

FOREIGN PATENT DOCUMENTS

| | | |
|---|---|---|
| DE | 199 33 835 | 2/1998 |
| DE | 197 55 112 | 6/1998 |
| DE | 199 07 338 | 5/2000 |
| EP | 937 614 | 8/1999 |
| EP | 1004494 | 5/2000 |
| GB | 2 338 274 | 12/1999 |

OTHER PUBLICATIONS

"FDR —Die Fahrdynamikregelung von Bosch" [ESP— electronic stability program of Bosch], ATZ Automobiltechnische Zeitschrift, vol. 96, Issue No. 11 (1994) pp. 674–689 described in the Specification.

* cited by examiner

Primary Examiner—Gary Chin
(74) Attorney, Agent, or Firm—Kenyon & Kenyon

(57) ABSTRACT

A device for monitoring a pressure sensor, which is positioned in a braking system of a vehicle. For this purpose, the device contains arrangement with which, during a braking action, a first vehicle motion variable is ascertained, which characterizes a vehicle motion in the longitudinal direction. The device further includes arrangement with which a mass variable is ascertained, which characterizes the mass of the vehicle. Using further arrangement, it is ascertained, for the monitoring of the pressure sensor, whether the first vehicle motion variable lies within a value range for the first vehicle motion variable, whose limits are ascertained as a function of the mass variable.

18 Claims, 5 Drawing Sheets

DEVICE AND METHOD FOR MONITORING A PRESSURE SENSOR

FIELD OF THE INVENTION

The present invention relates to a device and a method for monitoring a pressure sensor, which is positioned in a braking system of a vehicle.

BACKGROUND INFORMATION

Conventional devices and method for monitoring a pressure sensor are available. For example, the following procedure for monitoring a pressure sensor is described in the article "FDR—Die Fahrdynamikregelung von Bosch" [ESP—electronic stability program of Bosch] published in the automotive engineering journal ATZ Automobiltechnische Zeitschrift, vol. 96, issue no. 11 (1994) pp. 674 through 689: In order to monitor a pressure sensor, in this case an admission pressure sensor, a so-called active pressure sensor test is carried out. In this active pressure sensor test, braking pressure is fed into the braking system, using a pump included in the braking system, preferably using a precharge pump. At the same time, it is checked whether the pressure sensor signal is acting plausibly.

This kind of monitoring has the disadvantage that an active pressure buildup is required to carry out the pressure sensor test, and this is realized with the aid of a precharge pump. As a result, this pressure sensor test cannot be used for braking systems which do not have a precharge pump at their disposal. This kind of pressure sensor test also has the disadvantage that, during malfunctioning of the precharge pump, monitoring the pressure sensor is no longer possible.

Consequently, an object of the present invention is to create a device and a method for monitoring a pressure sensor which, respectively, do not require an active pressure buildup. That is, monitoring a pressure sensor is to be realized, without the use of a precharge pump.

German Patent Application DE 197 55 112 A1 does not describe a method or monitoring device for carrying out a pressure sensor test. However, this application describes a method and a monitoring device for determining fading of the braking action of a motor vehicle brake. To do this, the longitudinal acceleration of the vehicle is measured. The measured longitudinal acceleration is related to an ascertained braking operation. From this is determined whether the measured vehicle longitudinal acceleration corresponds to the braking operation. To determine the braking operation, in particular the braking pressure in a brake fluid line or the excursion of the brake pedal are measured.

SUMMARY

According to an example embodiment of the present invention, a device for monitoring a pressure sensor positioned in a braking system of a vehicle includes means whereby a first vehicle movement variable is ascertained during a braking action, which characterizes a vehicle motion in the longitudinal direction. The device, according to the example embodiment further includes means with which a mass variable is ascertained that characterizes the mass of the vehicle. Advantageously, for monitoring the pressure sensor, the device according to the present invention includes means with which are ascertained whether the first vehicle motion variable lies within a value range for the first vehicle motion variable, whose limits are ascertained as a function of the mass variable.

Since the first vehicle motion variable is a function of the vehicle mass, this procedure ensures that, for monitoring the pressure sensor, the first vehicle motion variable is compared to a "matching" value range, that is, to a value range adapted to the mass of the vehicle.

Advantageously, the first vehicle motion variable is ascertained during a braking action performed by the driver. To do this, only such braking actions are registered in which a regulating device contained in the vehicle does not execute any interventions on the vehicle brakes independently of the driver. Advantageously, the mass variable is ascertained during at least one drive operation. To do this, only such drive operations are registered in which a regulating device contained in the vehicle does not execute any interventions on the propulsion independently of the driver. Because, as the braking actions and/or the drive operations, only those are registered, on which no driver-independent interventions in the vehicle brakes and/or the propulsion are being carried out, one makes sure that monitoring of the pressure sensor in so-called stable operating states of the vehicle is being carried out. Due to this procedure for monitoring the pressure sensor, no precharge pump is necessary, since, at least within the framework of this monitoring, no driver-independent braking actions are necessary or rather, are taken into account. Thus, the monitoring of the pressure sensor according to the example embodiment of the present invention can also be used for braking systems which have no precharge pump, but instead have a pneumatic booster. Additionally, the pressure sensor can also be monitored if a precharge pump malfunctions in a braking system equipped with a precharge pump.

Using the pressure sensor monitored by the device and the method according to the present invention, an admission pressure variable is ascertained which describes the admission pressure set by the driver. As part of the sensor system, the device according to the present invention may be further provided with means with which wheel speed variables are ascertained, which describe the wheel speeds of the individual wheels. Advantageously, the first vehicle motion variable is ascertained as a function of the admission pressure variable and the wheel speed variables.

Advantageously, in the device according to the present invention, means are provided with which a first vehicle deceleration variable is ascertained, at least as a function of the admission pressure variable. This represents the vehicle deceleration to be expected theoretically on account of the operation of the brake by the driver. Ascertainment of the first vehicle deceleration variable is advantageously made by using a mathematical model. As parameters, this contains nominal values, i.e., fixed, predefined variables for the braking torque translation, namely, the wheel radius as well as the vehicle mass. Advantageously, the first vehicle deceleration variable is ascertained in a small timing window. Thus, one may assume that interfering influences, such as wind forces, downgrade forces or driving resistance forces have no influence.

In the device according to the present invention, further means are advantageously provided with which a second vehicle deceleration variable is ascertained, as a function of the wheel speed variables of the rear wheels. This represents the vehicle deceleration which actually occurs during the braking action. In order that the second vehicle deceleration variable represents the actually occurring vehicle deceleration as accurately as possible, those wheel speed variables of the wheels are used for ascertaining it which are less subject to slipping during a braking action. During a braking action, these are the rear wheels.

For the purpose of ascertaining the first vehicle motion variable, the first and the second vehicle deceleration variable are brought in relation to each other. In this connection, use is made of the fact that, during partial braking, a correlation exists between the admission pressure, which enters into the first vehicle deceleration variable and the vehicle deceleration that occurs, which is represented by the second vehicle deceleration variable. In the case in point, for the ascertainment of the first vehicle motion variable for successive time steps, in each case a relationship is formed between the present first and second vehicle deceleration variable, respectively. The first vehicle motion variable is formed as the average of these relationships. Since there is a connection between the first vehicle motion variable and the sensitivity of the pressure sensor, this first vehicle motion variable can be used to monitor the pressure sensor, in particular, to monitor the sensitivity of the pressure sensor.

As described above, the mathematical model for ascertaining the first vehicle deceleration variable includes as a parameter a fixed, predefined value for the vehicle mass. Since, however, depending on the loading of the vehicle, the vehicle mass can differ, this should be taken into account in monitoring the pressure sensor. Therefore, the limits of the value range, mentioned above, are ascertained as a function of the mass variable. Thereby, tighter error recognition thresholds can be used for monitoring the pressure sensor. The mass variable is advantageously ascertained as a function of a torque variable which describes the drive torque delivered to each drive wheel.

Corresponding to the ascertainment of the first vehicle motion variable, the mass variable is ascertained as a function of a first and a second vehicle acceleration variable. For this purpose, in the device according to the present invention, means are provided with which the first vehicle acceleration variable can be ascertained, at least-as a function of the torque variable. This describes the vehicle acceleration to be theoretically expected during the drive procedure. The first vehicle acceleration variable is advantageously ascertained with the aid of a mathematical model, in which the wheel radius as well as the vehicle mass are used as parameters. Corresponding to the first vehicle deceleration variable, the first vehicle acceleration variable is also ascertained in a small time window. This ensures that interfering proportionate shares in the acceleration, which can come about, for example, through wind forces, downgrade forces or driving resistance forces, have no influence on the ascertainment of the first vehicle acceleration variable, because, during this small time window, they may be assumed to be constant, and thus eliminated.

Furthermore, in the device according to the present invention, means are provided with which the second vehicle acceleration variable is ascertained as a function of the vehicle speeds of the wheels not driven. This describes the vehicle acceleration which actually occurs. Since the second vehicle acceleration variable should describe the actually occurring acceleration as accurately as possible, in correspondence to the procedural manner in the braking action, in the drive procedure as well, those wheels are taken into consideration, which are less subject to slipping. In the drive procedure, these are the wheels not driven.

In the device according to the example embodiment of the present invention, means are advantageously provided with, the aid of which, for successive time steps, in each case a relationship is formed of the respectively present first and second vehicle acceleration variable. From these relationships, a second vehicle motion variable is formed as an average value. By forming an average value, the information quality of the second vehicle motion variable is increased, because not only a single point in time, but various points in time, and thus various first and second vehicle acceleration variables enter into the ascertainment of the second vehicle motion variable. The mass variable is ascertained as a function of the second vehicle motion variable. With reference to the information quality of the first vehicle motion variable, in relation to the first and the second deceleration variable, the same thing applies correspondingly.

Advantageously, for the ascertainment of the mass variable, the second vehicle motion variable is compared to the predefined comparison values for the second vehicle motion variable, and the mass variable is ascertained as a function of these comparisons. In this connection, it has proven sufficient, using the mass variable, to distinguish at least between a lightly loaded, a heavily loaded and an overloaded vehicle. In the case of a lightly loaded vehicle, first limits are selected for the value range, and second limits are selected in the case of a heavily loaded vehicle. In this connection, the spread of the first limits is less than the spread of the second limits. The limits ascertained as a function of the mass variable determine the value range of the first vehicle motion variable. Since the first vehicle deceleration variable enters into the ascertainment of the first vehicle motion variable, which is ascertained with the aid of a mathematical model which has nominal values of the vehicle mass and the braking torque transmission, and since the actually present variables of the vehicle mass and the braking torque transmission can be different from the nominal values, the value range has to be adapted to the actually present vehicle states at least as a function of the vehicle mass which, as described above, may be estimated, in order that one can perform meaningful monitoring of the pressure sensor. In this connection, in the case of greater vehicle mass, the value range must be selected larger on account of greater possibilities of fluctuations, so that a more certain monitoring of the pressure sensor can be undertaken. In the case of an overloaded vehicle, no monitoring of the pressure sensor is performed, since in this case, the fluctuation of the vehicle motion variable is too great, and thus, a meaningful monitoring of the pressure sensor is no longer possible.

Several drive procedures, successive in time, are advantageously evaluated for ascertaining the mass variable. Correspondingly, to determine whether the pressure sensor is defective or not, several braking actions, successive in time, are evaluated. By evaluating several procedures, the quality of each variable or the information is improved. Because, before the value of the mass variable is fixed or before a statement is made about whether the pressure sensor is faulty or not, the observation results which enter into the measured variable or the information have to be reproducible several times, one after the other. That means, that a faulty value or a faulty information on account of an outlier in the observation results is excluded by this procedure.

During a starting period of the vehicle engine, which is determined by the driver-dependent starting and stopping of the vehicle engine, advantageously, at least one monitoring of the pressure sensor is carried out. This means that, during the time span defined by turning the ignition key to start the vehicle engine and by pulling the ignition key to stop the engine, at least one monitoring of the pressure sensor is carried out. In the following discussion, this starting period is denoted as an ignition cycle.

Advantageously, the status of the pressure sensor present during the preceding starting period is taken into account in monitoring the pressure sensor during the current starting period or the current ignition cycle. The process of the monitoring of the pressure sensor during the current starting period is determined as a function of this status. Thus, in the case that, during the preceding starting period, no malfunction of the pressure sensor was determined, monitoring the pressure sensor is carried out with the aid of the value range, whose limits are ascertained as a function of the mass variable. On the other hand, in the case that, during the preceding starting period, a malfunction of the pressure sensor was determined, a modified monitoring of the pressure sensor is carried out with the aid of a value range whose limits are predefined in a fixed manner. In this connection, the spread of these limits predefined in a fixed manner is greater than the spread of the limits ascertained as a function of the mass variable.

As mentioned above, at least one monitoring of the pressure sensor is carried out during one starting period. In this connection, an attempt is made to begin the monitoring of the pressure sensor as rapidly as possibly after starting the vehicle engine, and to terminate it as soon as possible, i.e., to be able to make a statement as soon as possible as to whether the pressure sensor is faulty or not. However, in the framework of monitoring the pressure sensor, as was mentioned above, since several braking actions and several drive procedures are being evaluated, the time span required for monitoring the pressure sensor has different values, depending on the manner of drive of the driver.

In the above description, the concept of the preceding starting period is used, which says implicitly that, starting from the current starting period, clearly, the directly preceding starting period is to be taken into accounted. In this connection, one of the previous starting periods can also be taken into account, or several of the previous starting periods.

If no fault of the pressure sensor is determined in the modified monitoring of the pressure sensor, advantageously, subsequently to the modified monitoring of the pressure sensor, a monitoring of the pressure sensor is carried out with the aid of the value range, whose limits are ascertained as a function of the mass variable. This means that the regular, i.e., customary monitoring of the pressure sensor follows the modified monitoring of the pressure sensor.

It has proven of particular advantage, to terminate monitoring of the pressure sensor in the case where a fault of the pressure sensor is determined in response to the modified monitoring. Since both during the preceding starting period the pressure sensor was recognized as being faulty, and in response to the modified monitoring of the pressure sensor a fault was again determined, the pressure sensor is assumed to be constantly faulty. That is why renewed monitoring of the pressure sensor is no longer required.

Advantageously, during the performance of the modified monitoring, a regulating device included in the vehicle, for which a pressure variable, ascertained with the aid of the pressure sensor, represents an initial value, is switched to passive.

It is of particular advantage, for the case in which the monitoring carried out with the aid of the value range whose limits are ascertained as a function of the mass variable, a fault of the pressure sensor is determined, if a regulating device included in the vehicle, for which a pressure variable, ascertained with the aid of the pressure sensor, represents an initial value, is switched off. This manner of proceeding secures that no faulty interventions in the actuator technology takes place. Alternatively, instead of switching off the regulating device, an operation under emergency conditions is provided to set in, in which it has reduced regulating functions.

During the monitoring of the pressure sensor, its sensitivity is advantageously checked.

DETAILED DESCRIPTION

Figure 1:
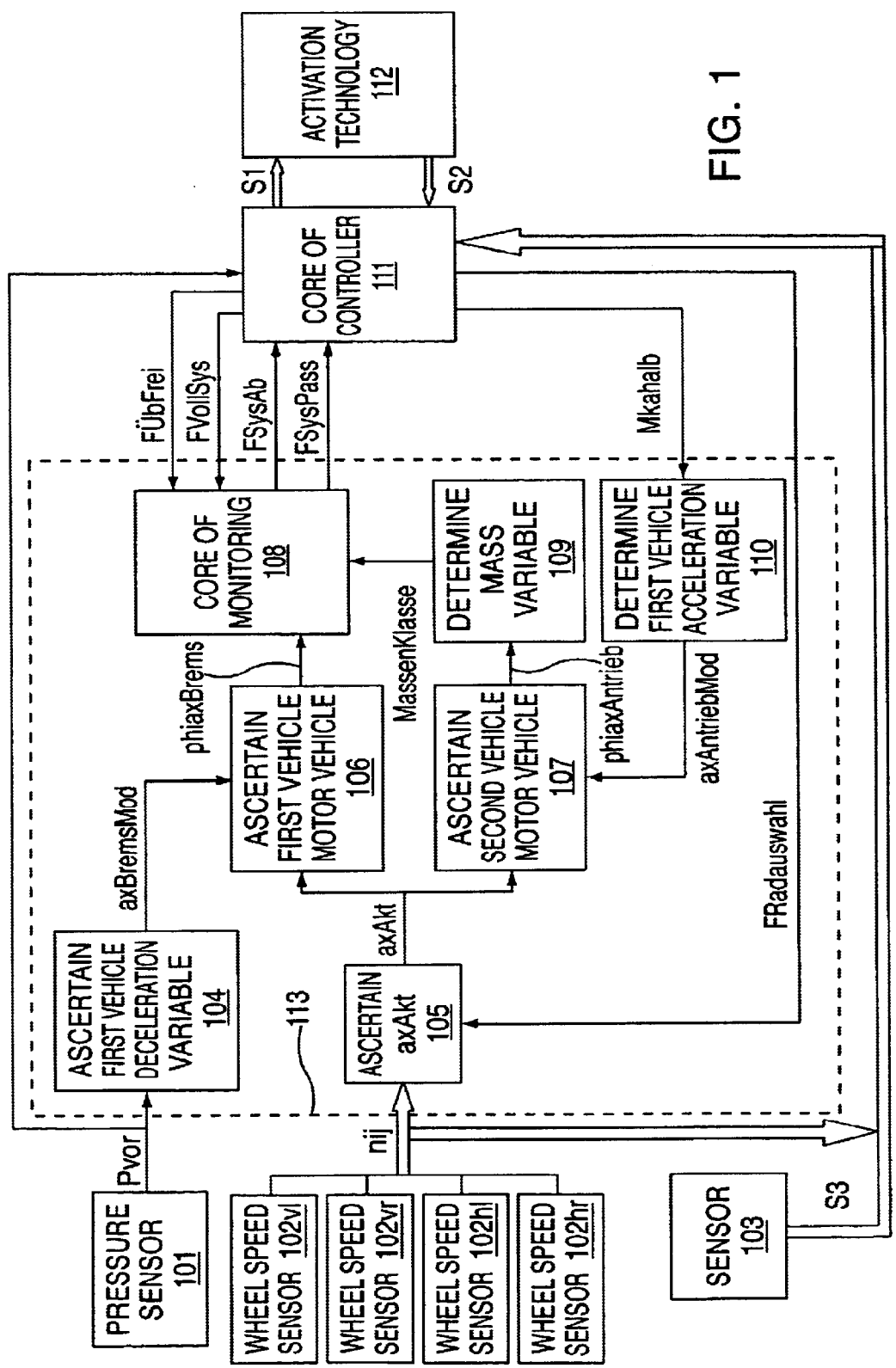
FIG. 1 is a block diagram of a device according to and example embodiment of the present invention.

Block 101 represents a pressure sensor positioned in the braking system of a vehicle, which is to be monitored with the aid of the device according to the present invention. The variable Pvor, generated with the aid of pressure sensor 101, which describes the pressure measured or recorded by pressure sensor 101, is supplied to both block 104 and block 111. In the present exemplary embodiment, since we are concerned with an admission pressure sensor as pressure sensor 101, with which the admission pressure, set by the driver, is to be measured, the variable Pvor is also denoted as an admission pressure variable.

In block 104 a first vehicle deceleration variable axBremsMod is ascertained as a function of admission pressure Pvor. The first vehicle deceleration variable axBremsMod is ascertained with the aid of a mathematical model, for which values predefined in a fixed manner for the braking torque translation, the wheel radius and the vehicle mass are used. Since the first vehicle deceleration variable axBremsMod is ascertained as a function of admission pressure Pvor, this describes the vehicle deceleration theoretically to be expected, based on the operation of the brake by the driver. The first vehicle deceleration variable axBremsMod is supplied to a block 106.

Blocks 102vl, 102vr, 102hl and 102hr represent wheel speed sensors with which wheel speed variables nij are ascertained, which describe the wheel speeds of the individual wheels. Wheel speeds nij are supplied to both block 105 and block 111. Corresponding to the notation of the wheel speed variables, the abbreviating notation 102ij can also be used for the wheel speed sensors. Here, indices i and j have the following meaning: Index i indicates whether a front axle (v) or a rear axle (h) is being referred to. Index j indicates whether a right (r) or a left (1) vehicle wheel is being referred to.

In block 105 a variable axAkt is ascertained as a function of wheel speed variables nij. Depending on which wheel speed variables nij go into the ascertainment of variable axAkt, this variable axAkt is concerned with a second vehicle deceleration variable axAktBrems or with a second vehicle acceleration variable axAktAntrieb. For the sake of clarity, in FIG. 1 only the variable axAkt is represented in connection with block 105. The above mentioned choice of wheel speed variables takes place as a function of the variable FRadauswahl which is supplied from block 111 to block105. If vehicle deceleration variable axAktBrems is ascertained in block 105, it is supplied to block 106. If, on the other hand, second vehicle acceleration variable axAktAntrieb is ascertained in block 105, it is supplied to a block 107. The concrete realization of block 105, as well as the concrete ascertainment of the second vehicle deceleration variable axAktBrems or the second vehicle acceleration variable axAktAntrieb are described below in connection with FIG. 2. It should be noted here that the representation of the ascertainment of second vehicle deceleration variable axAktBrems or second vehicle acceleration variable axAktAntrieb with the aid of a single block 105 should have no limiting effect. It is also possible to use two blocks, one block for the second vehicle deceleration variable and one block for the second vehicle acceleration variable.

Block 103 represents further sensor means, which are positioned in the vehicle, in connection with the regulating device contained in the vehicle. If the current subject in this regulating device is, for example, operating dynamics regulation, with which a variable describing the lateral-motion dynamics, especially the yaw rate of the vehicle is to be regulated, block 103 includes the following sensor means: a steering angle sensor, a transversal acceleration sensor as well as a yaw rate sensor. In addition, block 103 also includes a braking light switch, which registers the operation of the brake pedal by the driver, and a gas pedal switch, with which the operation of the gas pedal is registered. Further signals S3 generated with the aid of sensor means 103 are supplied to block 111.

A first vehicle acceleration variable axAntriebMod is ascertained, with the aid of block 110, as a function of a torque variable Mkahalb, which is supplied to block 110, starting from block 111. The torque variable Mkahalb describes the driving torque being supplied to each driven wheel. This torque variable is available from a regulating device, which carries out engine interventions, which is the case, for example, in the case of a yaw rate regulation or an ordinary engine control. The ascertainment of the first vehicle acceleration variable axAntriebMod is made using a mathematical model, for which values, predefined in a fixed manner, for the wheel radius and the vehicle mass are used as parameter. The first vehicle acceleration variable axAntriebMod represents the vehicle acceleration theoretically to be expected. The first vehicle acceleration variable axBremsMod is supplied to block 107.

Using block 106, a first vehicle motion variable is ascertained. For this purpose, for each successive time step, a ratio is formed from each of the first vehicle deceleration variable axBremsMod and the second vehicle deceleration variable axAktBrems present, i.e., for successive time steps, in each case the quotient of these two vehicle deceleration variables is formed. These ratios represent, for each time step, a measure of the deviation of the actually occurring vehicle deceleration from the vehicle deceleration theoretically to be expected, on account of the operation of the brake by the driver. In order to be able to make a more accurate statement on this deviation, an average value of these ratios is formed, which represents the first vehicle motion variable. The first vehicle motion variable phiaxBrems is proportional to the sensitivity of the pressure sensor. For this reason, monitoring of the pressure sensor can be performed with the aid of first vehicle motion variable phiaxBrems. In order to do this, first vehicle motion variable phiaxBrems is supplied to a block 108.

Using block 107, a second vehicle motion variable phiaxAntrieb is ascertained. For this purpose, for each successive time step, a ratio is formed from each of the first vehicle acceleration variable axAntriebMod and second vehicle acceleration variable axAktAntrieb present. That is, for successive time steps, in each case a quotient of each present first and second vehicle acceleration variable is formed. These ratios or quotients represent a measure of the vehicle mass, because it is the vehicle acceleration theoretically to be expected, which results from the driving torque supplied to each driven wheel, and the actually occurring vehicle acceleration, which are put into ratio with each other. The second vehicle motion variable phiaxAntrieb is supplied to a block 109.

In block 109 a mass variable MassenKlasse is ascertained as a function of second vehicle motion variable phiaxAntrieb, and it is supplied to block 108. The specific procedure in ascertaining the mass variable MassenKlasse is discussed below, in conjunction with FIG. 4.

The actual core of the monitoring of pressure sensor 101 takes place in block 108, as a function of first vehicle motion variable phiaxBrems and mass variable MassenKlasse. Additional variables FütbFrei and FvollSys are supplied to block 108 from block 111, for carrying out this monitoring. During the monitoring of the pressure sensor, block 108 influences block 111 by variable FSysPass. The result of monitoring the pressure sensor is supplied to block 111 with the aid of a variable FSysAb. The meaning of the variables mentioned above, and the manner in which the monitoring of the pressure sensor is actually carried out, are discussed within the framework of FIG. 5.

Block 111 represents the core of the controller of the regulating device contained in the vehicle. Starting from sensor variables Pvor as well as S3 supplied to it, controller core 111 ascertains signals or variables S1, which are supplied to block 112, which represents the actuator technology contained in the vehicle. If, in the regulating device contained in the vehicle, we are concerned with an electronic stability program, block 112 represents the individual wheel brakes, as well as means for influencing the drive torque provided by the engine. Then, starting from the signals or variables S1, individual wheels are braked to stabilize the vehicle, or rather the engine torque delivered by the engine is reduced. Starting from block 112, variables or signals S2 are supplied to controller core 111, which give the controller core information regarding the respective status of the actuator technology. The specific procedure can be obtained from the article described above, "FDR(ESP)—the Electronic Stability Program of Bosch".

The components that are utilized according to the example embodiment of the present invention are combined into a block 113 in FIG. 1.

Figure 2:
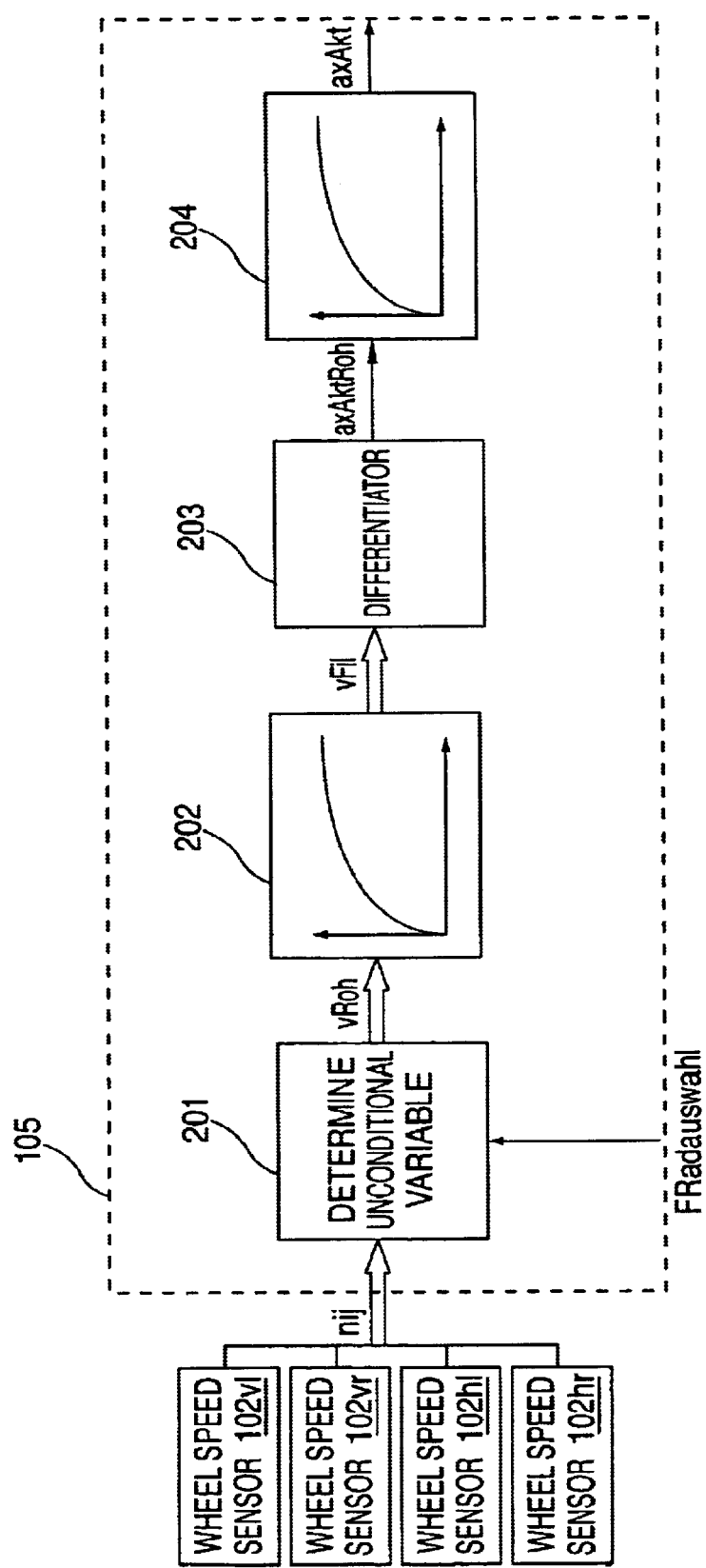
FIG. 2 is a block diagram of an example means for ascertaining a variable axakt, which is either a vehicle deceleration variable or a vehicle acceleration variable.

The ascertainment of variable axAkt taking place in block 105 is shown in detail in FIG. 2. The wheel speed variables nij, ascertained with the aid of wheel speed sensors 102*ij*, are supplied to block 201. Starting from wheel speed variables nij, an unconditioned variable vRoh is ascertained as the vehicle speed in block 201. The variable axakt describes the acceleration of the vehicle, and here both the positive and the negative acceleration is meant. In order that variable axAkt might describe as accurately as possible the actually present acceleration of the vehicle, the most suitable wheels, i.e., the wheels less subject to slipping, are selected as a function of the vehicle status in each case. Selection of the wheels and the appertaining wheel speed variables nij takes place with the aid of variable FRadauswahl, which is generated in block 111, as was described above in connection with FIG. 1. The procedure is as follows: If a braking action is present, the rear wheels are selected. In that case, variable axAkt represents the second vehicle deceleration variable axAktBrems. On the other hand, if a drive procedure is present, the non-driven wheels are selected. In that case, variable axakt represents the second vehicle acceleration variable axAktAntrieb. In order to recognize whether a braking action or a drive procedure is present, the signals from the brake light switch and the gas pedal switch are evaluated in block 111. During a braking action, the brake light switch provides a signal, while the gas pedal switch does not provide a signal. During a drive procedure, the gas pedal light switch provides a signal, while the brake light switch does not provide a signal.

The unconditioned variable vRoh of the vehicle speed is supplied to a block 202. Block 202 represents a filter means, with the use of which a filtered vehicle speed vFil is ascertained from the unconditioned variable vRoh. Filter means 202 is, for example, a lowpass. The filtered vehicle speed vFil is supplied to a block 203. Block 203 represents a differentiator, with which is formed the differential with respect to time axAktRoh of filtered vehicle speed vFil. Thus, the variable axAktRoh describes the acceleration of the vehicle. Variable axAktRoh is supplied to a block 204, which also represents a filter means. Corresponding to block 202, this filter means is also designed as a lowpass. With the aid of filter means 204, the variable axAktRoh is transformed into variable axAkt.

Advantageously, the two filter means 202 and 204 are adjusted to each other. Using the two filter means 202 and 204, a sufficiently smooth and, at the same time, a dynamically acceptable signal pattern is achieved, which, as mentioned above, describes the acceleration of the vehicle. In the first place, influences in the wheel speed variables are eliminated, which stem from so-called rugged road surfaces.

The three components 202, 203 and 204 can be designed as analog or digital circuits.

In the light of the above comments, made in connection with the selection of wheel speed variables, it should have become clear that variable axAkt, depending on the operating state of the vehicle (drive procedure or braking action), corresponds to either second vehicle acceleration variable axAktAntrieb or to second vehicle deceleration variable axAktBrems.

At this point it should be mentioned that, during a drive procedure, variable axAkt can also alternatively be ascertained from vehicle reference speed vRef. This vehicle reference speed .vRef is present in block 111, and is ascertained, in a conventional manner, from wheel speed variables nij in consideration of the vehicle motion, which is described; for example, by the transversal acceleration or the yaw rate of the vehicle. The same applies to an all-wheel-driven vehicle. Vehicle reference speed vRef is not identical to unconditioned variable vRoh as the vehicle speed.

Figure 3:
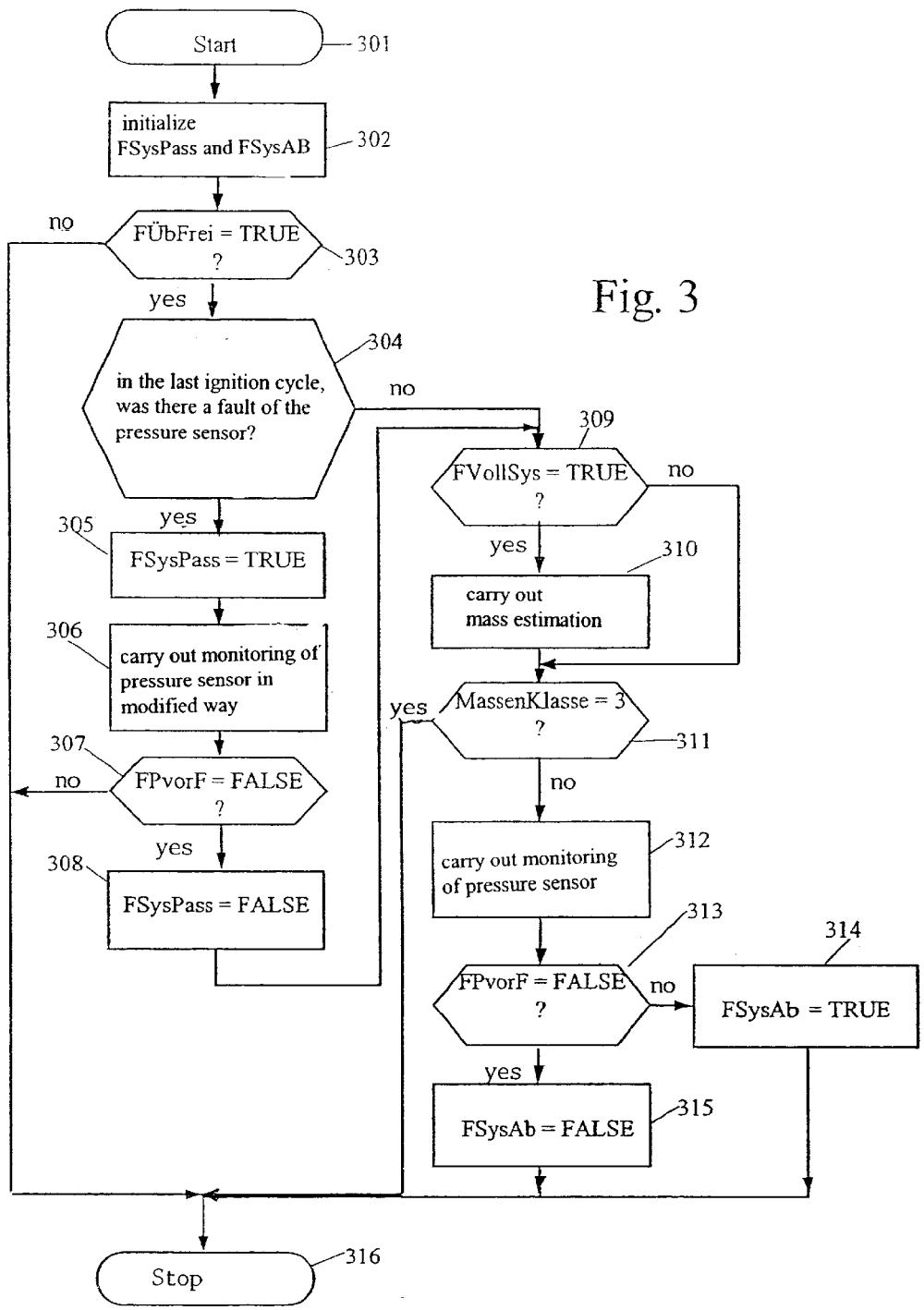
FIG. 3 is a flow diagram of a method according to an example embodiment of the present invention, which runs on the device according to the example embodiment of the present invention.

The sequence of the method according to the present invention is described with the aid of the flow diagram shown in FIG. 3. The method according to the present invention begins with a step 301, followed by a step 302. In this step 302, the variables FSysPass and FSysAb are initialized. With the aid of variable FSysPass, the regulating device contained in the vehicle, and thus also controller core 111 are switched to passive.

With the aid of variable FSysAb, the regulating device, and thus the controller core is switched off. Since the regulating device should neither be switched to passive nor switched off at the stage of step 302, both variables are initialized by the value FALSE. Subsequent to step 302, a step 303 is carried out. Step 303 checks whether the value TRUE has been assigned to variable FÜbFrei. By use of variable FÜbFrei, starting from block 111, block 108 is notified whether monitoring of the pressure sensor has been released or not. If variable FÜbFrei has the value TRUE, which means the same as that the monitoring of the pressure sensor has been released, i.e., has the inquiry taking place in step 303 has been satisfied, subsequently to step 303 a step 304 is executed. On the other hand, if the variable FÜbFrei does not have the value TRUE, which means the same as that the monitoring of the pressure sensor has not been released, then following step 303 a step 316 is carried out, with which the monitoring of the pressure sensor comes to an end.

For the monitoring of the pressure sensor to be released, various additional conditions have to be satisfied:

No driver-independent braking interventions and/or engine interventions may be carried out. Thus, it is ensured that the vehicle is in a stable state. Checking whether driver-independent braking interventions and/or engine interventions are present can be done using internally formed variables in block 111.

No pumping activity of a pump contained in the braking system may be present. This ensures that the admission pressure set by the driver, which is evaluated by monitoring the pressure sensor, is not invalidated. A corresponding evaluation with respect to pump activity is possible with the aid of internal variables of block 111.

The driver may neither clutch nor shift. That excludes load changes which would have a negative influence on ascertaining the first vehicle deceleration variable or the first vehicle acceleration variable. If the vehicle is equipped with an automatic transmission, clutching or shifting can be recognized by evaluating appropriate flags. If the vehicle is equipped with a standard shift, then the engine speed is monitored with regard to this matter.

The steering angle set by the driver must not exceed a predefined value. This ensures that monitoring the pressure sensor does not take place during travel in a curve having a small radius of curvature. For, in such curve travel, additional components may appear in the measured longitudinal acceleration which refer back to the curve travel itself, and which would lead to invalidation of the results in monitoring the pressure sensor. Alternatively to the consideration of the steering angle, the transversal acceleration and/or the yaw rate of the vehicle can also be take into accounted.

No implausible wheel signal may be present. If an implausible wheel signal is determined, the corresponding wheel speed sensor remains unconsidered during monitoring of the pressure sensor.

A tire tolerance alignment must have been made. With the aid of the tire tolerance alignment, different wheel radii are detected and corrected.

An adjustment of the pressure sensor to be monitored must have taken place. For this purpose, by forming the average value, the offset in the signal of the pressure sensor is ascertained. This offset is taken into account in the evaluation of the pressure sensor's signal.

The vehicle speed must be greater than a predefined value.

In step 304 it is checked whether a fault of the pressure sensor occurred during the last ignition cycle. If such a fault occurred, subsequently to step 304 a step 305 is executed, by which a modified monitoring of the pressure sensor is introduced. On the other hand, if it is determined in step 304 that there was no fault of the pressure sensor in the last ignition cycle, then following step 304 a step 309 is carried out, which introduces the core of the monitoring of the pressure sensor.

In step 305, the value TRUE is assigned to variable FSysPass, whereby the regulating device contained in the vehicle is switched to passive. Following step 305, a step 306 is carried out in which monitoring of the pressure sensor is carried out in a modified fashion. Carrying out the monitoring of the pressure sensor is discussed in detail in connection with FIG. 5. The modified monitoring of the pressure sensor is carried out with the aid of a value range whose limits are predefined in a fixed manner, and whose spread is greater than the spread of the limits ascertained as a function of the mass variable.

Subsequent to step 306, a step 307 is carried out. In step 307, variable FPvorF is evaluated, which is set as a function of the result of monitoring the pressure sensor. In this connection, the following assignment is valid: If it is determined, during monitoring of the pressure sensor, that the latter is faulty, the value TRUE is assigned to variable FPvorF. On the other hand, if it is determined, during monitoring of the pressure sensor, that the latter is not faulty, the value FALSE is assigned to variable FPvorF. Now, during the interrogation taking place in step 307, if it is determined that the value FALSE has been assigned to variable FPvorF, a step 308 is carried out following step 307, in which the value FALSE is assigned to variable FSysPass, which means the same thing as canceling the switching to passive of the regulating device. On the other hand, if the interrogation occurring in step 307 is not satisfied, which means the same as that the pressure sensor is faulty, then subsequently to step 307 step 316 is executed.

Step 309 follows step 308. In this step, the value of variable FVollSys is evaluated. Block 108 is notified with the aid of variable FVollSys from block 111, whether the full system is available, i.e., whether the individual components of the regulating device contained in the vehicle may be reverted to. In this connection, the following value assignment is valid for variable FVollSys: The value TRUE indicates that the full system is available, and the value FALSE indicates that the full system is not available. If it is determined in step 309 that the value TRUE has been assigned to variable FVollSys, a step 310 is carried out subsequently to step 309, in which a mass estimation is carried out. The specific procedure for the mass estimation is discussed in connection with FIG. 4. Subsequent to step 310, a step 311 is carried out. If, on the other hand, the interrogation occurring in step 309 is not satisfied, the mass estimation cannot be carried out, on account of which step 311 is carried out at once, following step 309.

With the aid of the interrogation taking place in step 311, it is determined whether the vehicle is overloaded or not. For this purpose, it is checked whether the value 3 has been assigned to mass variable MassenKlasse. If it is determined in step 311 that the vehicle is overloaded, i.e., that the value 3 has been assigned to mass variable MassenKlasse, then monitoring the pressure sensor is not possible. For that reason, subsequent to step 311, step 316 is carried out. On the other hand, if it is determined that the vehicle is not overloaded, monitoring of the pressure sensor can take place, on account of which, subsequently to step 311, a step 312 is executed. The actual procedure in carrying out the monitoring of the pressure sensor occurring in step 312 is discussed in detail in connection with FIG. 5.

Step 312 is followed by a step 313, in which the result of monitoring the pressure sensor is evaluated. If it is determined in step 313 that the value FALSE has been assigned to the variable FPvorF, which means the same thing as that the pressure sensor is not faulty, a step 315 is performed following step 313. In step 315, the value FALSE is assigned to variable FSysAb. Following step 315, step 316 is carried out. On the other hand, if the interrogation occurring in step 313 is not satisfied, a step 314 is carried out following step 313, in which the value TRUE is assigned to variable FSysAb. Thus, since the pressure sensor is faulty, the regulating device contained in the vehicle is switched off. Step 316 follows step 314.

Figure 4:
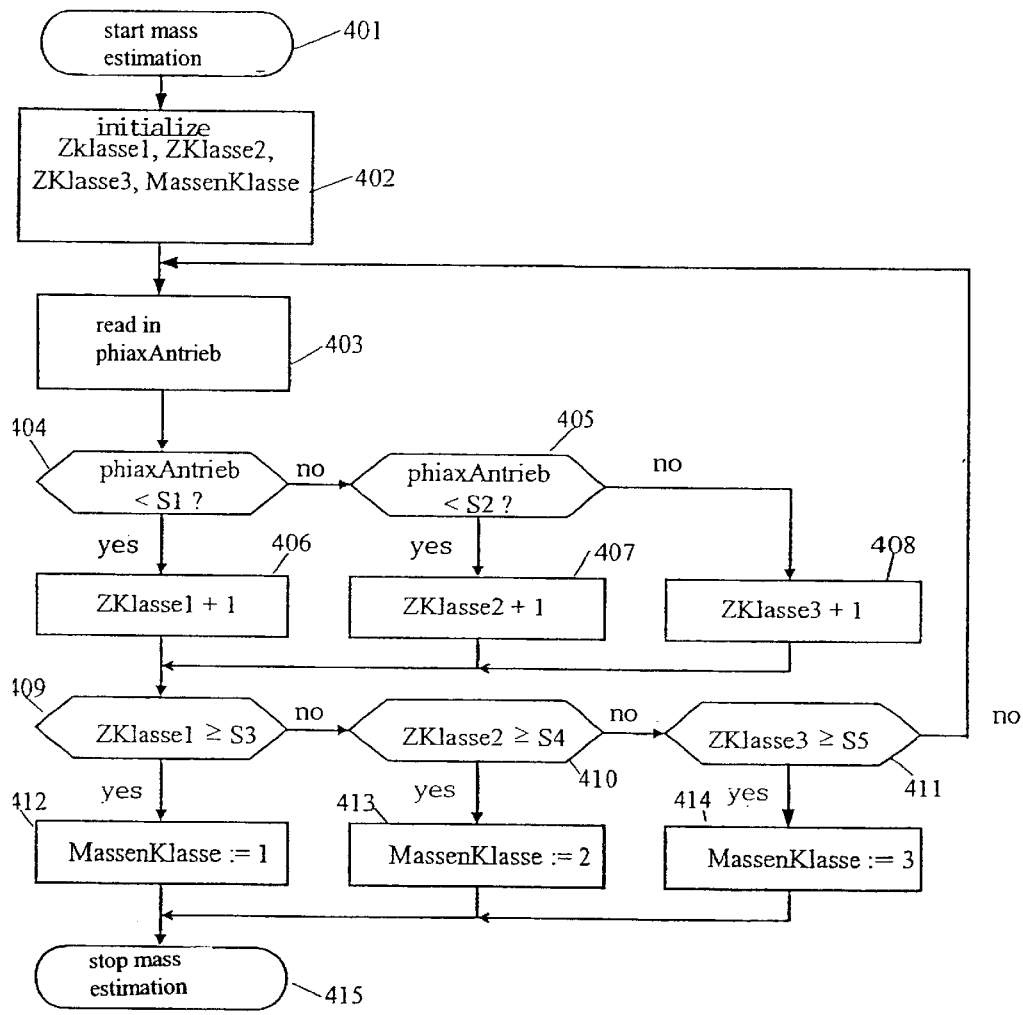
FIG. 4 is a flow diagram showing the ascertainment of a mass variable.

With the aid of a flow diagram, FIG. 4 shows the mass estimation taking place in step 310. The mass estimation begins with a step 401, followed by a step 402. In this step, the values ZKlassel, ZKlasse2 and Zklasse3, which all represent counting units, are initialized. In addition, the mass variable MassenKlasse is initialized. Subsequent to step 402, a step 403 is carried out. In step 403, the second vehicle motion variable phiaxAntrieb is read in, which is generated, as mentioned before, in block 107 by evaluating several successive time steps of a drive procedure. Subsequent to step 403, a step 404 is carried out.

Step 404 checks whether the second vehicle motion variable phiaxAntrieb is smaller than a threshold value S1. If the second vehicle motion variable is smaller than threshold value S1, which means the same thing as that the vehicle is loaded only lightly, then a step 406 is carried out following step 404. In this step 406, the counting unit ZKlassel, which stands for a lightly loaded vehicle, is raised by 1. Subsequent to step 406, a step 409 is carried out. On the other hand, if it is determined in step 404 that second vehicle motion variable phiaxAntrieb is greater than threshold value S1, then a step 405 is executed following step 404. In summary, it can be established that: With the aid of the interrogation taking place in step 404, it is determined whether the vehicle is only lightly loaded or not.

Step 405 checks whether second vehicle motion variable phiaxAntrieb is less than a threshold value S2, threshold value S2 being greater than threshold value S1. If the second vehicle motion variable is less than threshold value S2, which means the same as that the vehicle is heavily loaded, then a step 407 is carried out following step 405, in which the counting unit ZKlasse2, which stands for a heavily loaded vehicle, is increased by 1. Following step 407, step 409 is carried out. On the other hand, if it is determined in step 405 that the second vehicle motion variable phiaxAntrieb is greater than threshold value S2, which means the same as that the vehicle is overloaded, then a step 4d8 is carried out following step 405, in which the counting unit Zklasse3, which stands for an overloaded vehicle, is increased by 1. Following step 408, step 409 is also carried out. In summary, it can be established that: With the aid of the query occurring in step 405 it is determined whether this is a case of a heavily loaded or an overloaded vehicle. The two threshold values S1 and S2 define a value range for second vehicle motion variable phiaxAntrieb.

In step 409 counting unit ZKlasse1 is compared to a threshold value S3. If counting unit ZKlasse1 is greater than, or equal to threshold value S3, step 412 is carried out, following step 409, in which the value 1 is assigned to mass variable MassenKlasse, since a lightly loaded vehicle was recognized. Following step 412, a step 415 is carried out, with which the mass estimation is terminated. On the other hand, if step 409 determines that counting unit Zklasse1 is less than threshold value S3, then a step 410 is carried out following step 409.

In step 410 counting unit Zklasse2 is compared to a threshold value S4. If counting unit Zklasse2 is greater than, or equal to threshold value S4, step 413 is carried out, following step 410, in which the value 2 is assigned to mass variable MassenKlasse, since a heavily loaded vehicle was recognized. Step 415 follows step 413. On the other hand, if it is determined in step 410 that counting unit ZKlasse2 is less than threshold value S4, then a step 411 is executed following step 410. In step 411 counting unit ZKlasse3 is compared to a threshold value S5. If counting unit Zklasse3 is greater than, or equal to threshold value S5, step 414 is carried out, following step 411, in which the value 3 is assigned to mass variable MassenKlasse, since an overloaded vehicle was recognized. Step 415 follows step 414. On the other hand, if it is determined in step 411 that counting unit ZKlasse3 is less than threshold value S5, then step 403 is executed once again, following step 411.

The procedural principle of the mass estimation is as follows:

The mass estimation is based on the evaluation for drive procedures (step 403). Using second vehicle motion variable phiaxAntrieb and the value range defined by the two threshold values S1 and S2, it is first ascertained whether a lightly loaded or a heavily loaded or an overloaded vehicle is present in the currently to be evaluated drive procedure. As a function of the result obtained thereby, counting unit ZKlasse1, ZKlasse2 or ZKlasse3 is implemented as appropriate for the respective loading state of the vehicle. In order to make the monitoring of the pressure sensor independent of individual mis-estimations, which can happen in case unfavorable boundary conditions are present, a counting unit function is integrated into the mass estimation, so that altogether several drive procedures have to be evaluated, before a definitive statement is at hand, as to which loading state applies to the vehicle. The number of drive procedures to be evaluated is determined by threshold values S3, S4 or S5. In FIG. 4 it is provided that threshold values S3, S4 and S5, having different values, are used for individual counting units ZKlasse1, ZKlasse2 and ZKlasse3. However, in practice, these threshold values all have the same value. Thus, the loading state of the vehicle is determined by the counting unit which first exceeds this value. The values of the threshold values S1, S2, S3, S4, S5 and S6 are applied to the respective vehicle. In principle, a finer subdivision with regard to the loading state of the vehicle is also possible, if this should be relevant for monitoring the pressure sensor.

Figure 5:
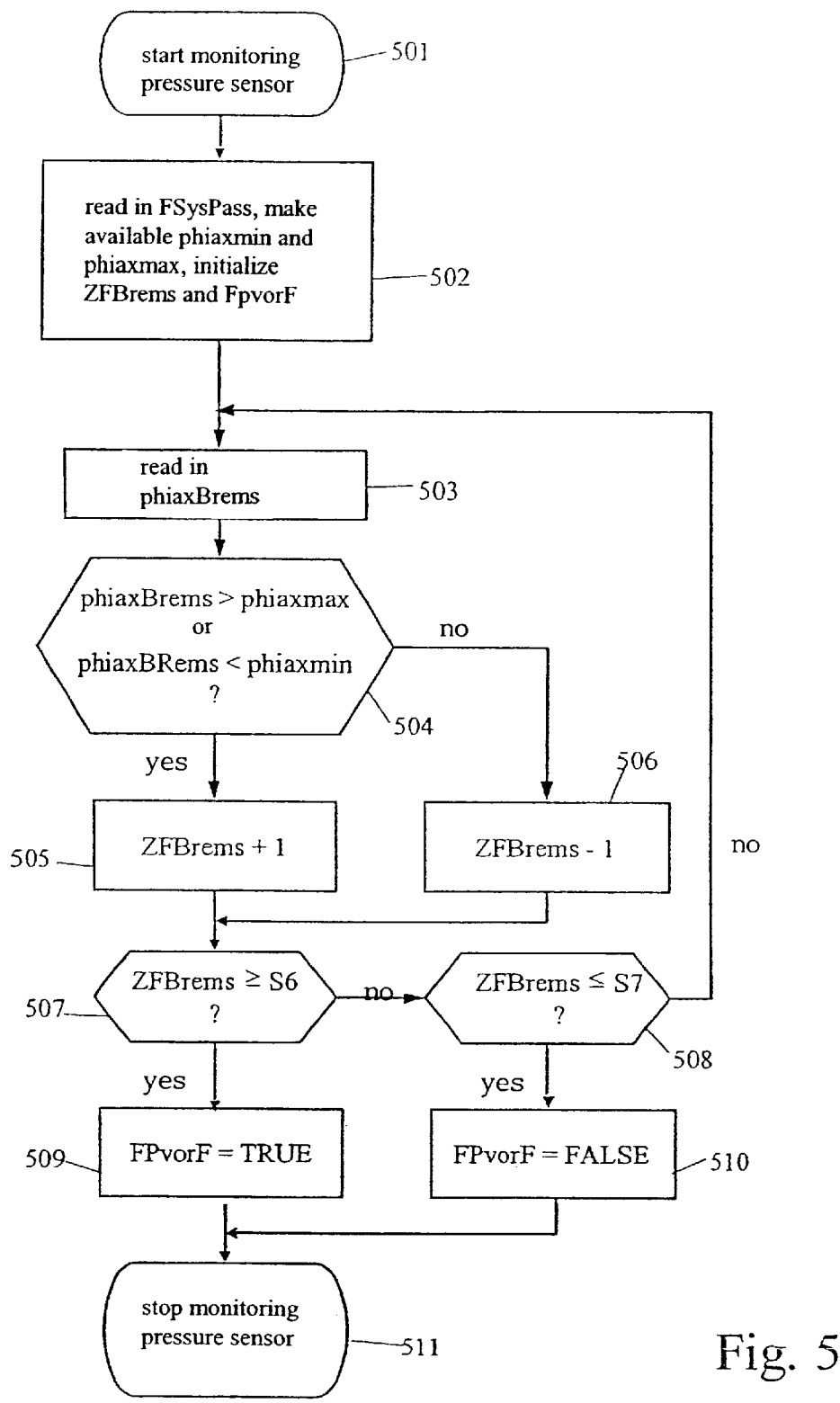
FIG. 5 is a flow diagram showing the core of monitoring the pressure sensor.

The monitoring of the pressure sensor taking place in block 108 is shown in the flow diagram in FIG. 5. The monitoring of the pressure sensor begins with a step 501, followed by a step 502. In step 502, on the one hand the variable FSysPass is read in, and the two limits phiaxmin and phiaxmax of the value range for the first vehicle motion variable are made available. In making available or ascertaining the two limits phiaxmin and phiaxmax, the procedure is as follows: First, the variable FSysPass is evaluated. If variable FSysPass has the value TRUE, a modified monitoring of the pressure sensor should be carried out, which is why values predefined in a fixed manner are made available for the two limits phiaxmin and phiaxmax. On the other hand, if variable FSysPass has the value FALSE, a modified monitoring of the pressure sensor should not be carried out, which is why the two limits phiaxmin and phiaxmax are ascertained as a function of mass variable MassenKlasse. For a lightly loaded vehicle, the two limits phiaxmin and phiaxmax lie closer together than for a heavily loaded vehicle, i.e., for a lightly loaded vehicle, the spread of the two limits is less than for a heavily loaded vehicle. The values predefined in a fixed manner for the two limits, which are used in the case of a modified monitoring of the pressure sensor, have an even greater spread than the limits which are used in the case of a heavily loaded vehicle. In addition, in step 502 the two variables ZFBrems and FPvorF are initialized. Variable ZFBrems has the character of a counting unit. Subsequently to step 502, a step 503 is carried out in which first vehicle motion variable phiaxBrems is read in for the current braking action which is ascertained in block 106. Subsequent to step 503, a step 504 is carried out.

Step 504 checks whether first vehicle motion variable phiaxBrems lies within the value range defined by the two limits phiaxmin and phiaxmax, limit phiaxmin being less than limit phiaxmax. For this, a check is made whether the first vehicle motion variable is greater than limit phiaxmax, or whether the first vehicle motion variable is less than limit phiaxmin.

If it is determined in step 504 that the first vehicle motion variable, lies outside the value range, i.e., it is determined that the first vehicle motion variable is either greater than limit phiaxmax or less than limit phiaxmin, which means the same thing as the pressure sensor for the currently present braking action appearing to be faulty, then following step 504, a step 505 is carried out, in which counting unit ZFBrems is increased by 1. Subsequent to step 505, a step 507 is carried out. On the other hand, if it is determined in step 504 that the first vehicle motion variable lies within the value range, which means the same thing as the pressure sensor for the currently present braking action not seeming to be faulty, then subsequently to step 504, step 506 is carried out, in which counting unit ZFBrems is reduced by 1. Following step 506, step 507 is also carried out.

In step 507 counting unit ZFbrems is compared to a threshold value S6. If it is determined in step 507 that counting unit ZFBrems is greater than, or equal to threshold value S6, which means the same thing as the pressure sensor being recognized as faulty for several braking actions, then following step 507 a step 509 is carried out, in which the value TRUE is assigned to variable FPvorF, by which it is indicated that the pressure sensor was recognized as being faulty. Following step 509, a step 511 is carried out, with which the core of monitoring the pressure sensor is terminated.

On the other hand, if step 507 determines that counting unit ZFBrems is less than threshold value S6, then a step 508 is carried out following step 507. Step 508 checks whether counting unit ZFBrems is less than, or equal to threshold value S7. If this is the case, the pressure sensor is fault-free, on account of which, following step 508 a step 510 is carried out, in which the value FALSE is assigned to variable FPvorF. Following step 510, step 511 is also carried out. On the other hand, if step 508 determines that counting unit ZFBrems is greater than threshold value S7, i.e., the value of counting unit ZFBrems lies between the two threshold values S6 and S7, which means the same thing as a statement as to whether the pressure sensor is faulty or fault-free not yet being conclusively possible, then step 503 is carried out again, following step 508.

At this point, let the procedural principle in the actual core of the monitoring of the pressure sensor be summarized once more: This core is based on the evaluation of the braking actions (step 503). Using first vehicle motion variable phiaxBrems and the value range determined by the two limits phiaxmin and phiaxmax, it is ascertained whether the pressure sensor is faulty or not for the braking action currently to be evaluated. As a function of the result obtained therefrom, counting unit ZFBrems is increased or decreased. In order to make monitoring the pressure sensor independent of individual faulty estimates, a counting unit function is integrated, so that altogether several braking actions have to be revalued before a definitive statement can be made, as to whether a pressure sensor is faulty or not. The number of braking actions to be evaluated is determined by the value of threshold values S6, or S7. In FIG. 5 it is provided that these threshold values have different values. In practice, however, the two threshold values S6 and S7 have the same numerical value, S6 being positive and S7 negative. The values of threshold values S6 and S7 are applied to any vehicle in question, for example, in preliminary tests.

In closing, the core of monitoring the pressure sensor according to the present invention should once more be summarized: The monitoring of the pressure sensor is based on a comparison of a vehicle longitudinal deceleration, which is calculated, with the support of a model, from the measured signal of the pressure sensor, and the actually present vehicle longitudinal deceleration, which is calculated from the measured wheel speeds. Operation of the brake pedal by the driver leads to an admission pressure, and thus, via a pressure supply to the wheel brake cylinders leads to a braking of the vehicle. If the model-supported vehicle deceleration and the actually present vehicle longitudinal deceleration do not agree, then this is an indication of a faulty pressure sensor. Since the vehicle mass influences the deceleration behavior of the vehicle, and thus also influences the monitoring of the pressure sensor, the latter is taken into account in ascertaining the value range on which monitoring the pressure sensor is based. The vehicle mass is likewise ascertained by a comparison. In this comparison, a model-supported vehicle acceleration, which is ascertained beginning with the driving torque supplied to each driven wheel, is compared to the actually present vehicle acceleration which is ascertained as a function of the wheel speeds. A difference between these two values can be attributed to the influence of the vehicle mass.

The monitoring according to the present invention replaces the active pressure sensor test that has been performed up to now. In this regard, the quality of the monitoring according to the present invention is better than that of the existing active tests.

In conclusion, it should further be pointed out that the form of the exemplary embodiment selected in the description as well as the representation selected in the figures should not have any restrictive effect on the idea according to the present invention.

TRANSLATION OF TERMS USED IN THE FIGURES

FIG. 1
terms are mostly not full words, but suggestive fragments.
Brems refers to braking
Antrieb refers to drive or driving
Massenklasse refers to mass classification
Radauswahl refers to wheel selection
übfrei refers to monitoring being released
Vollsyst refers to the full regulating system
Sysab refers to system off
Syspass refers to system switched to passive FIG. 2
Fragmentary terms same as in figure1
Roh refers to unconditioned value
Fil refers to filtered
Radauswahl—see FIG. 1

FIG. 3
301 start
302 initialize FSysPass and FSysAb
303 no . . .
yes
304 in the last ignition cycle, was there a fault of the pressure sensor?
yes
305
306 carry out monitoring of pressure sensor in modified way
307
308
309
310 carry out mass estimation
311
312 carry out monitoring of pressure sensor
316 stop FIG. 4
401 start mass estimation
402 initialize z . . . etc
403 read in phiaxAntrieb
404
415 stop mass estimation FIG. 5
501 start monitoring pressure sensor
502 read in FSysPass, make available phiaxmin and phiaxmax, initialize ZFBrems and FpvorF
503 read in phiaxBrems
504 oder is or
511 stop monitoring pressure sensor

What is claimed is:

1. A device for monitoring a pressure sensor positioned in a braking system of a vehicle, comprising:
  a first determination arrangement configured to ascertain during a braking action a first vehicle motion variable which characterizes a vehicle motion in a longitudinal direction;
  a second determination arrangement configured to ascertain a mass variable which characterizes a mass of the vehicle; and
  a third determination arrangement coupled to the first determination arrangement and the second determination, the third determination arrangement configured to ascertain, for monitoring the pressure sensor, if the first vehicle motion variable is within a value range, limits of the value range being determined as a function of the mass variable.

2. The device according to claim 1, wherein the device checks a sensitivity of the pressure sensor.

3. The device according to claim 1, wherein during an ON-duration of an engine of the vehicle, at least one monitoring of the pressure sensor is carried out, the ON-duration being determined by a driver-dependent switching-on and switching-off of the engine of the vehicle; and wherein at least one of:
  in an event that a fault condition is not detected during a preceding ON-duration, the limits of the value range are determined as the function of the mass variable, and
  in an event that a fault condition is detected during a preceding ON-duration, a modified monitoring of the pressure sensor is performed, the limits of the value range being predefined in a fixed manner, a spread of the limits predefined in the fixed manner being greater than a spread of the limits determined as a function of the mass variable.

4. The device according to claim 3, wherein at least one of:
in an event that a fault condition is not detected during the modified monitoring of the pressure sensor and after the modified monitoring of the pressure sensor, a monitoring of the pressure sensor is carried out within the value range, the limits of the value range being determined as a function of the mass variable;
in an event that a fault is detected during the modified monitoring of the pressure sensor, at least one of: the monitoring of the pressure sensor is terminated, and a regulating device, for which a pressure variable ascertained using the pressure sensor represents an input variable, is switched to passive mode; and
in an event that a fault of the pressure sensor is detected during the monitoring with the value range determined as a function of the mass variable, the regulating device is switched off.

5. The device according to claim 1, wherein the first determination arrangement is configured to at least one of: i) ascertain the first vehicle motion variable during a braking action performed by a driver, and ii) ascertain the mass variable during at least one drive procedure, at least one of the braking action and the drive procedure being one in which a regulating device included in the vehicle carries out no driver-independent interventions in at least one of brakes of the vehicle and propulsion of the vehicle.

6. The device according to claim 1, further comprising:
a fourth determination arrangement coupled to the first determination arrangement and configured to ascertain wheel speed variables, the wheel speed variables describing wheel speeds of individual wheels of the vehicle, the first vehicle motion variable being ascertained as a function of the wheel speed variables and an admission pressure variable, the admission pressure variable describing an admission pressure set by a driver and being ascertained using the pressure sensor.

7. The device according to claim 1, further comprising:
a fourth determination arrangement configured to ascertain wheel speed variables, the wheel speed variables describing wheel speeds of individual wheels of the vehicle, wherein the mass variable is ascertained as a function of a torque variable which describes a driving torque supplied to each driven wheel, and the wheel speed variables.

8. The device according to claim 6, further comprising:
a fifth determination arrangement configured to ascertain a first vehicle deceleration variable as least as a function of the admission pressure variable; and
a sixth determination arrangement configured to ascertain a second vehicle deceleration variable as a function of the wheel speed variables of rear wheels of the vehicle, the first vehicle deceleration variable and the second vehicle deceleration variable being put into relation with each other for ascertaining the first vehicle motion variable.

9. The device according to claim 8, wherein the fifth determination arrangement is configured to ascertain the first deceleration variable using a mathematical model, the first deceleration variable representing vehicle deceleration theoretically to be expected due to an operation of a brake by the driver, and wherein the second vehicle deceleration variable represents actual vehicle deceleration.

10. The device according to claim 9, wherein the first determination arrangement is configured to determine, for each of successive time steps, a ratio of the first vehicle deceleration variable and the second vehicle deceleration vehicle, the first vehicle motion variable being ascertained as a function of an average value of the ratios.

11. The device according to claim 7, further comprising:
a fifth determination arrangement configured to ascertain a first vehicle acceleration variable at least as a function of the torque variable; and
a sixth determination arrangement configured to ascertain a second vehicle acceleration variable as a function of the wheel speeds of non-driven wheels of the vehicle;
wherein the mass variable is determined as a function of the first vehicle acceleration variable and the second vehicle acceleration variable.

12. The device according to claim 11, wherein the first vehicle acceleration variable is ascertained using a mathematical model, and wherein the first vehicle acceleration variable represents a theoretical acceleration to be expected, and wherein the second vehicle acceleration variable is an actual vehicle accleration.

13. The device according to claim 12, further comprising:
a seventh determination arrangement configured to determine, for each of successive time steps, a ratio of the first vehicle acceleration variable and the second vehicle acceleration variable, a second vehicle motion variable being formed as an average value of the ratios, the mass variable being ascertained as a function of the second vehicle motion variable.

14. The device according to claim 1, further comprising:
a fourth determination arrangement configured to ascertain a second vehicle motion variable, the second vehicle motion variable being compared to comparison variables predefined for the second vehicle motion variable, the mass variable being ascertained as a function of the comparison.

15. The device according to claim 14, wherein a distinction is made between a lightly loaded vehicle, a heavily loaded vehicle and an overloaded vehicle, using the mass variable, wherein in a case of a lightly loaded vehicle, first limits are selected for the value range, in a case of a heavily loaded vehicle, second limits are selected for the value range, a spread of the first limits being less than a spread of the second limits, in a case of an overloaded vehicle, no monitoring of the pressure sensor is carried out.

16. The device according to claim 1, wherein at least one of:
a plurality of drive procedures successive in time are evaluated for ascertaining the mass variable; and
a plurality of braking actions successive in time are evaluated for determining if the pressure sensor is faulty.

17. A method for monitoring a pressure sensor positioned in a braking system of a vehicle, comprising:
ascertaining during a braking action a first vehicle motion variable which characterizes a vehicle motion in a longitudinal direction;
ascertaining a mass variable which characterizes a mass of the vehicle; and
monitoring the pressure sensor by determining if the first vehicle motion variable is within a value range, limits of the value range being ascertained as a function of the mass variable.

18. The method according to claim 17, wherein the monitoring step includes checking a sensitivity of the pressure sensor.

* * * * *